United States Patent
Wang et al.

(10) Patent No.: US 11,915,660 B2
(45) Date of Patent: Feb. 27, 2024

(54) LIGHT-EMITTING DEVICE FOR DISPLAY SCREEN AND METHOD OF CONTROLLING THE SAME

(71) Applicant: SAVANT TECHNOLOGIES LLC, East Cleveland, OH (US)

(72) Inventors: Qingkai Wang, Shanghai (CN); Yankun Gong, Shanghai (CN); Kun Xiao, Shanghai (CN); Xiaohong Chu, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/072,372

(22) Filed: Nov. 30, 2022

(65) Prior Publication Data

US 2023/0197018 A1    Jun. 22, 2023

(30) Foreign Application Priority Data

Dec. 21, 2021    (CN) .......................... 202111575699.0

(51) Int. Cl.
*G09G 3/34*    (2006.01)
*G09G 3/32*    (2016.01)

(52) U.S. Cl.
CPC ............. *G09G 3/3413* (2013.01); *G09G 3/32* (2013.01); *G09G 3/3426* (2013.01)

(58) Field of Classification Search
CPC ...... G09G 3/32; G09G 3/3233; G09G 3/3208; G09G 3/3216; G09G 3/3241; G09G 3/342; G09G 3/3406; G09G 3/3413; G09G 3/3426; G02F 1/133603; H05B 45/44

See application file for complete search history.

(56) References Cited

U.S. PATENT DOCUMENTS

| 7,894,000 B2 | 2/2011 | Gutta et al. |
| 8,222,837 B2 | 7/2012 | Galeazzi |
| 9,483,982 B1* | 11/2016 | Reddy ...................... H04N 5/64 |
| 2010/0097408 A1 | 4/2010 | Michael Marcellinus et al. |
| 2018/0342212 A1* | 11/2018 | Gorilovsky .......... G09G 3/3413 |

FOREIGN PATENT DOCUMENTS

WO    2005062608 A2    7/2005

* cited by examiner

*Primary Examiner* — Koosha Sharifi-Tafreshi
(74) *Attorney, Agent, or Firm* — WOOD IP LLC

(57) ABSTRACT

Provided is a light-emitting device for a display, and a method that includes light sources distributed on one or more strips, several light sources are arranged on each strip, and are electrically connected in a matrix manner, the number of rows and columns of the matrix are greater than 1, and each row and column of the matrix have a control line to receive a control signal; and a control unit that acquires a video signal to be provided to the display screen, from a signal source of the display screen, determines color and brightness of each light source according to the video signal, wherein each light source corresponds to a partial pixel area in the outermost periphery of a display area, and for each matrix, sequentially control each row or column of light sources in the matrix to emit light based on color and brightness within one light-emitting period.

24 Claims, 5 Drawing Sheets

LIGHT-EMITTING DEVICE FOR DISPLAY SCREEN AND METHOD OF CONTROLLING THE SAME

CROSS-REFERENCE TO RELATED APPLICATIONS

This application claims the benefit of Chinese Patent Application Serial Number 202111575699.0, filed Dec. 21, 2021, which is herein incorporated by reference.

DESCRIPTION

Field of Technology

The present application relates to a light-emitting device, and more specifically, to an improved light-emitting device for a display screen that is used in combination with the display screen to provide an immersive light-emitting effect, and a method of controlling the same.

BACKGROUND

At present, a light-emitting device for use in combination with a display screen has been developed, and the light-emitting device includes a ring of light sources that is arranged in a strip shape on an outer edge of the back of the display screen. A control unit of the light-emitting device acquires an input video signal of a displayed image on the display screen, and respectively instructs each light source in the ring of light sources to emit light corresponding to a video image at its location, thereby expanding the light-emitting range of the display screen and providing an immersive viewing experience.

However, the light-emitting device in the prior art requires individually controlling each light source to emit light. In this way, in the case of a large number of light sources, a large number of light source control lines will be required. For example, for a 65-inch display screen, hundreds of light sources require to be arranged, and correspondingly, hundreds of control lines are required. In particular, when the light sources are RGB light sources, each light source requires three control lines to respectively control R, G and B light-emitting diodes to emit light, which further increases the number of required control lines in times. However, since the light sources are arranged in a strip on the back of the display screen, and the width of the strip is limited, it is difficult to accommodate a huge number of control lines.

Therefore, it is necessary to reduce the number of control lines in the light-emitting device, while realizing the individual control of a plurality of light sources (for example, hundreds of light sources).

SUMMARY

The present application is proposed in view of the above problems. The main purpose of the present application is to provide a light-emitting device for a display screen, so as to at least solve a technical problem in the prior art that it is difficult to individually control a large number of light sources in a strip through a small number of control lines.

In order to achieve the above purpose, according to one aspect of the present application, a light-emitting device for a display screen is provided, including: a plurality of light sources distributed on one or more strips, wherein several light sources among the plurality of light sources are arranged on each strip, the several light sources are electrically connected in a matrix manner in circuit, the number of rows and the number of columns of the matrix are both greater than 1, and each row and each column of the matrix are respectively provided with a control line to receive a corresponding control signal; and a control unit having output lines corresponding to one or more matrices associated with the one or more strips, wherein each output line is connected to a corresponding row control line or column control line in a corresponding matrix, and the control unit is configured to: acquire a video signal from a signal source of the display screen, wherein the video signal is provided to the display screen for display; determine color and/or brightness information of each light source among the plurality of light sources according to the video signal, wherein each light source corresponds to a predetermined partial pixel area in the outermost periphery of a display area of the display screen; and for each matrix of the one or more matrices, control each row or each column of light sources in the matrix to emit light according to the color and/or brightness information of corresponding display position within one light-emitting period.

In this way, for the several light sources on each strip, by only arranging the control lines in each row and each column of the matrix in which the several light sources are connected, it is possible to realize the individual control of each light source among the several light sources, thereby realizing the individual control of each light source among the plurality of light sources with a reduced number of control lines.

Further, according to one embodiment of the present application, for each matrix of the one or more matrices, controlling each row or each column of light sources in the matrix to emit light according to the color and/or brightness information of corresponding display position within one light-emitting period includes: for each matrix of the one or more matrices, within one light-emitting period, controlling, according to a clock signal, each row or each column of light sources in the matrix to emit light in a preset light-emitting interval according to the color and/or brightness information of corresponding display position.

In this way, for the matrix associated with each strip, with the clock signal, each row or each column of light sources in the matrix may be sequentially controlled to emit light in a time sequence, so that the individual control for each light source in the matrix within one light-emitting period may be realized.

Further, according to one embodiment of the present application, sequentially controlling, according to the clock signal, each row of light sources in the matrix to emit light in the preset light-emitting interval according to the corresponding color and brightness information includes: for a matrix with M rows and N columns in the one or more matrices, acquiring a current clock signal, determining the $m^{th}$ row of light sources corresponding to the current clock signal, m being a positive integer not greater than M, activating the $m^{th}$ row control line in response to determining the $m^{th}$ row of light sources, and for each of the $m^{th}$ row of light sources, controlling a column control line corresponding to the light source according to the color and brightness information corresponding to the light source, so that the light source emits light in the preset light-emitting interval according to the corresponding color and brightness information; and/or, sequentially controlling, according to the clock signal, each column of light sources in the matrix to emit light in the preset light-emitting interval according to the corresponding color and brightness information includes: for a matrix with M rows and N columns in the one or more matrices, acquiring a current clock signal, determining the $n^{th}$ column of light sources corresponding to the current clock signal, n being a positive integer not greater than N, activating the $n^{th}$ column control line in response to determining the $n^{th}$ column of light sources, and for each of the $n^{th}$ column of light sources, controlling a row control line corresponding to the light source according to the color and brightness information corresponding to the light source, so that the light source emits light in the preset light-emitting interval according to the corresponding color and brightness information.

In this way, by means of the control of the row control lines and the column control lines, it is possible to control only a certain row of light sources or a certain column of light sources in the matrix to emit light in one preset light-emitting interval according to the clock signal, thereby controlling all the light sources in the matrix to emit light individually within one light-emitting period.

Further, according to one embodiment of the present application, for each light source among the plurality of light sources: the light source emits light when the row control line and the column control line corresponding to the light source are both activated, and does not emit light when either of the row control line and the column control line corresponding to the light source is not activated.

In this way, for the $m^{th}$ row of light sources in the M×N matrix, when the $m^{th}$ row control line is activated, its light emission depends on the control signals on the corresponding N column control lines; and for the $n^{th}$ column control line in the matrix, when the $n^{th}$ column control line is activated, its light emission depends on the control signals on the corresponding M row control lines. As a result, the individual control of each light source may be realized through the row control lines and the column control lines.

Further, according to one embodiment of the present application, each light source among the plurality of light sources includes a light-emitting diodes connected in parallel to the same row control line or the same column control line, and a is a positive integer.

In this way, each light source includes at least one light-emitting diode. The light-emitting diodes are arranged in any number, such that each light source may emit monochromatic light with varying brightness or color temperature, or emit colored light with both varying brightness and/or color.

Further, according to one embodiment of the present application, when each light source includes a light-emitting diodes connected in parallel to the same row control line, for each column control line in each matrix: the column control line includes a parallel sub-column control lines, and the output line corresponding to the column control line in the control unit includes a sub-column output lines, so that each sub-column output line is connected to a corresponding sub-column control line in the column control line.

In this way, the individual control of each light-emitting diode in each light source may be realized through the sub-column control lines, thereby realizing the individual control of the light emission of each light source.

Further, according to one embodiment of the present application, for each of the $m^{th}$ row of light sources, controlling the column control line corresponding to the light source according to the color and brightness information corresponding to the light source, so that the light source emits light in the preset light-emitting interval according to the corresponding color and brightness information includes: for each of the $m^{th}$ row of light sources, controlling the sub-column control lines corresponding to the light source according to the color and brightness information corresponding to the light source, so that the light source emits light in the preset light-emitting interval according to the corresponding color and brightness information.

In this way, for each light source in the $m^{th}$ row of light sources, when the $m^{th}$ row control line is activated, by controlling the sub-column control lines corresponding to the light source, it is possible to cause the light source to emit light in the preset light-emitting interval according to the corresponding color and brightness information.

Further, according to one embodiment of the present application, controlling the sub-column control lines corresponding to the light source according to the color and brightness information corresponding to the light source, so that the light source emits light in the preset light-emitting interval according to the corresponding color and brightness information includes: for the $n'^{th}$ light source in the $m^{th}$ row of light sources, n' being a positive integer not greater than N, determining, according to the color information corresponding to the light source, to activate which sub-column control lines among the $(a(n'-1)+1)^{th}$ sub-column control line to the $(an')^{th}$ sub-column control line corresponding to the light source, and determining, according to the brightness information corresponding to the light source, activation periods of some sub-column control lines that are determined to be activated in the preset light-emitting interval, wherein the higher the brightness indicated by the brightness information corresponding to the light source is, the longer the activation periods of the some sub-column control lines in the preset light-emitting interval are.

In this way, for each light source in the $m^{th}$ row of light sources, by means of determining the activation or inactivation of the sub-column control lines corresponding to the light source according to the color information, and determining the activation period of some sub-column control lines that are determined to be activated according to the brightness information, it is possible to control the light emission of the light source according to the color and brightness information corresponding to the light source.

Further, according to one embodiment of the present application, for each light-emitting diode in each light source among the plurality of light sources: the light-emitting diode emits light when the row control line and the sub-column control line corresponding to the light-emitting diode are both activated, and does not emit light when either of the row control line and the sub-column control line corresponding to the light-emitting diode is not activated.

In this way, when the N light sources in the $m^{th}$ row are controlled to emit light according to the corresponding color and brightness information, by activating the $m^{th}$ row control line, and differently activating the aN sub-column control lines according to the color and brightness information corresponding to the light-emitting diodes of the N light sources, it is possible to realize different light emission for the N light sources in the $m^{th}$ row.

Further, according to one embodiment of the present application, for each sub-column control line in each matrix: the sub-column control line is connected to a constant high level or a constant low level through a corresponding sub-column switch, the sub-column output line corresponding to the sub-column control line in the control unit is connected to a control electrode of the sub-column switch, and the sub-column control line is activated when the corresponding sub-column switch is closed.

In this way, the activation or deactivation of the sub-column control line may be realized through the control of the sub-column switch by the control unit.

Further, according to one embodiment of the present application, for each row control line in each matrix: when each sub-column control line is connected to a constant high level through a corresponding sub-column switch, the row control line is connected to a constant low level through a corresponding row switch; and when each sub-column control line is connected to a constant low level through a corresponding sub-column switch, the row control line is connected to a constant high level through a corresponding row switch, wherein a row output line corresponding to the row control line in the control unit is connected to a control electrode of the row switch, and the row output line is activated when the corresponding row switch is closed.

In this way, the activation or deactivation of the row control line may be realized through the control of the row switch by the control unit. When the row control line and the sub-column control line are respectively connected to the constant high level and the constant low level, the light emission of the corresponding light-emitting diode may be realized.

Further, according to one embodiment of the present application, when each light source includes a light-emitting diodes connected in parallel to the same column control line, for each row control line in each matrix: the row control line includes a parallel sub-row control lines, and the output line corresponding to the row control line in the control unit includes a sub-row output lines, so that each sub-row output line is connected to a corresponding sub-row control line in the row control line.

In this way, it is possible to realize the individual control of each light-emitting diode in each light source through the sub-row control lines, thereby realizing the individual control of the light emission of each light source.

Further, according to one embodiment of the present application, for each of the nth column of light sources, controlling the row control line corresponding to the light source according to the color and brightness information corresponding to the light source, so that the light source emits light in the preset light-emitting interval according to the corresponding color and brightness information includes: for the $m'^{th}$ light source in the $n^{th}$ column of light sources, m' being a positive integer not greater than M, determining, according to the color information corresponding to the light source, to activate which sub-row control lines among the $(a(m'-1)+1)^{th}$ sub-row control line to the $(am')^{th}$ sub-row control line corresponding to the light source, and determining, according to the brightness information corresponding to the light source, activation periods of some sub-row control lines that are determined to be activated in the preset light-emitting interval, wherein the higher the brightness indicated by the brightness information corresponding to the light source is, the longer the activation periods of the some sub-row control lines in the preset light-emitting interval are.

In this way, for each light source in the $n^{th}$ column of light sources, by determining the activation or inactivation of the a sub-row control lines corresponding to the light source according to the color information, and determining the activation period of some sub-row control lines that are determined to be activated according to the brightness information, it is possible to control the light emission of the light source according to the color and brightness information corresponding to the light source.

Further, according to one embodiment of the present application, each light-emitting diode among the light-emitting diodes includes a plurality of identical sub-light-emitting diodes.

In this way, the number of light-emitting diodes in the light source may be expanded, so that the light source may emit light with higher brightness.

Further, according to one embodiment of the present application, each light source among the plurality of light sources includes a red light-emitting diode, a green light-emitting diode, and a blue light-emitting diode.

In this way, the light sources in the light-emitting device for the display screen desired in the present application may be realized by the RGB LED.

Further, according to one embodiment of the present application, each strip of the one or more strips is arranged along a part of the outer edge of the back of the display screen, so that each light source among the plurality of light sources corresponds to the partial pixel area, which corresponds to the arrangement position of the light source, in the outermost periphery of the display area of the display screen.

In this way, by arranging and connecting the one or more strips in sequence along the outer edge of the back of the display screen, the entirety of light sources on the strips corresponds to the outermost peripheral area of the display area of the display screen, and each light source corresponds to the partial pixel area corresponding to the position of the light source in the outermost peripheral area. Thus, by making the light emitted by each light source change with the change of the color and brightness of the outermost peripheral area of the display area of the display screen, a viewer may obtain a more immersive viewing experience.

Further, according to one embodiment of the present application, determining the color and brightness information of each light source among the plurality of light sources according to the video signal includes: for each light source, acquiring, from the video signal, the color and brightness information of each pixel in the partial pixel area corresponding to the arrangement position of the light source, taking an RGB color gamut median color, an HSV color gamut median color, an RGB color gamut average color, or an HSV color gamut average color of all the pixels in the partial pixel area as the color information of the light source, and taking the highest brightness, the lowest brightness, the median brightness or the average brightness of all the pixels in the partial pixel area as the brightness information of the light source.

In this way, it is possible to determine the color and brightness of each light source among the plurality of light sources.

According to another aspect of the present application, a method of controlling a light-emitting device for a display screen is provided. The light-emitting device includes a plurality of light sources distributed on one or more strips, wherein several light sources among the plurality of light sources are arranged on each strip, the several light sources are electrically connected in a matrix manner in circuit, the number of rows and the number of columns of the matrix are both greater than 1, and each row and each column of the matrix are respectively provided with a control line to receive a corresponding control signal, and the control method includes: acquiring a video signal from a signal source of the display screen, wherein the video signal is provided to the display screen for display; determining color and brightness information of each light source among the plurality of light sources according to the video signal, wherein each light source corresponds to a predetermined partial pixel area in the outermost periphery of a display area of the display screen; and for each matrix of the one or more matrices associated with the one or more strips, sequentially controlling each row or each column of light sources in the matrix to emit light according to the color and/or brightness information of corresponding display position within one light-emitting period.

In this way, for the several light sources on each strip, by only arranging the control lines in each row and each column of the matrix in which the several light sources are connected, it is possible to realize the individual control of each light source among the several light sources, thereby realizing the individual control of each light source among the plurality of light sources with a reduced number of control lines.

Further, according to one embodiment of the present application, for each matrix of the one or more matrices, sequentially controlling each row or each column of light sources in the matrix to emit light according to the corresponding color and brightness information within one light-emitting period includes: for each matrix of the one or more matrices, within one light-emitting period, sequentially controlling, according to a clock signal, each row or each column of light sources in the matrix to emit light in a preset light-emitting interval according to the corresponding color and/or brightness information.

In this way, for the matrix associated with each strip, each row or each column of light sources in the matrix is sequentially controlled to emit light according to the clock signal, so that the individual control for each light source in the matrix within one light-emitting period may be realized.

Further, according to one embodiment of the present application, each row and each column in each matrix are respectively provided with a control line to receive a corresponding control signal, sequentially controlling, according to the clock signal, each row of light sources in the matrix to emit light in the preset light-emitting interval according to the corresponding color and brightness information includes: for a matrix with M rows and N columns in the one or more matrices, acquiring a current clock signal, determining the $m^{th}$ row of light sources corresponding to the current clock signal, m being a positive integer not greater than M, activating the $m^{th}$ row control line in response to determining the $m^{th}$ row of light sources, and for each of the $m^{th}$ row of light sources, controlling a column control line corresponding to the light source according to the color and brightness information corresponding to the light source, so that the light source emits light in the preset light-emitting interval according to the corresponding color and brightness information; and/or, sequentially controlling, according to the clock signal, each column of light sources in the matrix to emit light in the preset light-emitting interval according to the corresponding color and brightness information includes: for a matrix with M rows and N columns in the one or more matrices, acquiring a current clock signal, determining the $n^{th}$ column of light sources corresponding to the current clock signal, n being a positive integer not greater than N, activating the $n^{th}$ column control line in response to determining the $n^{th}$ column of light sources, and for each of the $n^{th}$ column of light sources, controlling a row control line corresponding to the light source according to the color and brightness information corresponding to the light source, so that the light source emits light in the preset light-emitting interval according to the corresponding color and/or brightness information.

In this way, by means of the control of the row control lines and the column control lines, it is possible to control only a certain row of light sources or a certain column of light sources in the matrix to emit light in one preset light-emitting interval according to the clock signal, thereby controlling all the light sources in the matrix to emit light individually within one light-emitting period.

Further, according to one embodiment of the present application, each light source among the plurality of light sources includes a light-emitting diodes connected in parallel to the same row control line or the same column control line, and a is a positive integer.

In this way, each light source includes at least one light-emitting diode. The light-emitting diodes are arranged in any number, such that each light source may emit monochromatic light with varying brightness or color temperature, or emit colored light with both varying brightness and/or color.

Further, according to one embodiment of the present application, when each light source includes a light-emitting diodes connected in parallel to the same row control line, each column control line in each matrix includes a parallel sub-column control lines, and for each of the $m^{th}$ row of light sources, controlling the column control line corresponding to the light source according to the color and brightness information corresponding to the light source, so that the light source emits light in the preset light-emitting interval according to the corresponding color and brightness information includes: for each of the $m^{th}$ row of light sources, controlling the sub-column control lines corresponding to the light source according to the color and brightness information corresponding to the light source, so that the light source emits light in the preset light-emitting interval according to the color and/or brightness information of corresponding display position.

In this way, for each light source in the $m^{th}$ row of light sources, when the $m^{th}$ row control line is activated, by controlling the sub-column control lines corresponding to the light source, it is possible to cause the light source to emit light in the preset light-emitting interval according to the corresponding color and brightness information.

Further, according to one embodiment of the present application, controlling the sub-column control lines corresponding to the light source according to the color and brightness information corresponding to the light source, so that the light source emits light in the preset light-emitting interval according to the corresponding color and brightness information includes: for the $n'^{th}$ light source in the $m^{th}$ row of light sources, n' being a positive integer not greater than N, determining, according to the color information corresponding to the light source, to activate which sub-column control lines among the $(a(n'-1)+1)^{th}$ sub-column control line to the $(an')^{th}$ sub-column control line corresponding to the light source, and determining, according to the brightness information corresponding to the light source, activation periods of some sub-column control lines that are determined to be activated in the preset light-emitting interval, wherein the higher the brightness indicated by the brightness information corresponding to the light source is, the longer the activation periods of the some sub-column control lines in the preset light-emitting interval are.

In this way, for each light source in the $m^{th}$ row of light sources, by means of determining the activation or inactivation of the sub-column control lines corresponding to the light source according to the color information, and determining the activation period of some sub-column control lines that are determined to be activated according to the brightness information, it is possible to control the light emission of the light source according to the color and brightness information corresponding to the light source.

Further, according to one embodiment of the present application, when each light source includes a light-emitting diodes connected in parallel to the same column control line, each row control line in each matrix includes a parallel sub-row control lines, and for each of the $n^{th}$ column of light sources, controlling the row control line corresponding to the light source according to the color and brightness information corresponding to the light source, so that the light source emits light in the preset light-emitting interval according to the corresponding color and brightness information includes: for the $m'^{th}$ light source in the $n^{th}$ column of light sources, m' being a positive integer not greater than M, determining, according to the color information corresponding to the light source, to activate which sub-row control lines among the $(a(m'-1)+1)^{th}$ sub-row control line to the $(am')^{th}$ sub-row control line corresponding to the light source, and determining, according to the brightness information corresponding to the light source, activation periods of some sub-row control lines that are determined to be activated in the preset light-emitting interval, wherein the higher the brightness indicated by the brightness information corresponding to the light source is, the longer the activation periods of the some sub-row control lines in the preset light-emitting interval are.

In this way, for each light source in the $n^{th}$ column of light sources, by determining the activation or inactivation of the a sub-row control lines corresponding to the light source according to the color information, and determining the activation period of some sub-row control lines that are determined to be activated according to the brightness information, it is possible to control the light emission of the light source according to the color and/or brightness information corresponding to the light source.

In the embodiments of the present application, a light-emitting device for a display screen and a method of controlling the same are provided. The light-emitting device includes a plurality of light sources distributed on one or more strips, wherein several light sources among the plurality of light sources are arranged on each strip, the several light sources are electrically connected in a matrix manner in circuit, the number of rows and the number of columns of the matrix are both greater than 1, and each row and each column of the matrix are respectively provided with a control line to receive a corresponding control signal; and a control unit having output lines corresponding to one or more matrices associated with the one or more strips, wherein each output line is connected to a corresponding row control line or column control line in a corresponding matrix, and the control unit is configured to: acquire a video signal from a signal source of the display screen, wherein the video signal is provided to the display screen for display; determine color and brightness information of each light source among the plurality of light sources according to the video signal, wherein each light source corresponds to a predetermined partial pixel area in the outermost periphery of a display area of the display screen; and for each matrix of the one or more matrices, control each row or each column of light sources in the matrix to emit light according to the color and/or brightness information of corresponding display screen within one light-emitting period. Therefore, the technical problem in the prior art that it is difficult to individually control a large number of light sources in a strip through a small number of control lines is at least solved, therefore the number of control lines is effectively reduced, and an effect of controlling a larger number of light sources in a strip with a limited width is realized.

BRIEF DESCRIPTION OF THE DRAWINGS

The drawings constituting a part of the present application are used for providing a further understanding of the present application, and the exemplary embodiments of the present application and descriptions thereof are used for explaining the present application, but do not constitute improper limitations of the present application. In the drawings.

DETAILED DESCRIPTION

Figure 1:
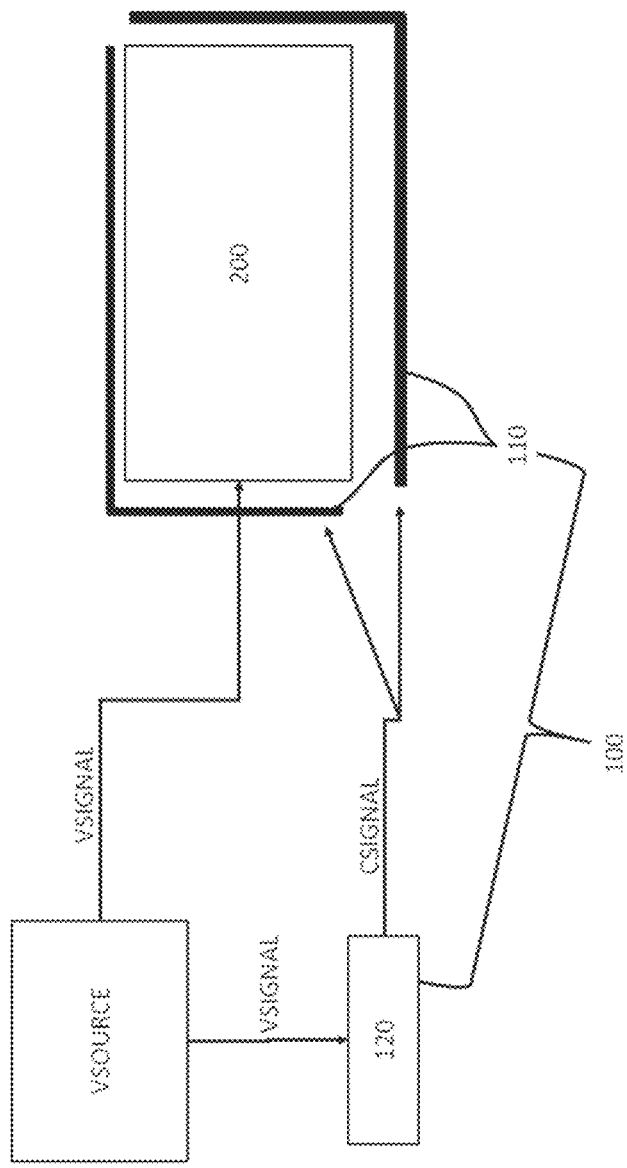
FIG. 1 shows a schematic diagram of signal transmission between a light-emitting device for a display screen according to an embodiment of the present application and the display screen.

To make it necessary to explain, if there is no conflict, embodiments in the present application and features in the embodiments may be combined with each other. Hereinafter, the present application will be described in detail with reference to the drawings and in conjunction with the embodiments.

It should be pointed out that, unless otherwise specified, all technical and scientific terms used in the present application have the same meanings as commonly understood by those of ordinary skill in the technical field to which the present application belongs.

In present application, unless otherwise stated, orientation words used such as "up, down, top and bottom" are usually directed to the directions shown in the drawings, or are directed to the vertical, perpendicular or gravitational direction of components themselves; and similarly, for the convenience of understanding and description, "inside and outside" refer to inside and outside relative to the contours of the components themselves, but the above-mentioned orientation words are not used for limiting the present application.

FIG. 1 shows a schematic diagram of signal transmission between a light-emitting device for a display screen according to an embodiment of the present application and the display screen. As shown in FIG. 1, the light-emitting device 100 for the display screen according to the embodiment of the present application includes a plurality of light sources distributed on one or more strips 110 (only two strips are shown as an example in FIG. 1), and a control unit 120. A video signal source VSOURCE of a display screen 200 transmits a video signal VSIGNAL, which is for display on a display area of the display screen 200, to the display screen 200, and also transmits the video signal VSIGNAL to the control unit 120. The control unit 120 converts the received video signal VSIGNAL into a control signal CSIGNAL for controlling each of the plurality of light sources, and transmits the control signal CSIGNAL to each corresponding light source via each strip 110.

In the present application, the video signal source VSOURCE is, for example, a video signal output party such as a vidicon, a DVD-ROM, a game machine, and a set-top box (when the display screen is a TV). The display screen 200 is, for example, a display device such as a television, a computer display screen, and a flat panel display screen. The video signal source VSOURCE may transmit the video signal VSIGNAL to the display screen 200 via an HDMI interface, and transmit the video signal VSIGNAL to the control unit 120 via another HDMI interface.

Figure 2A:
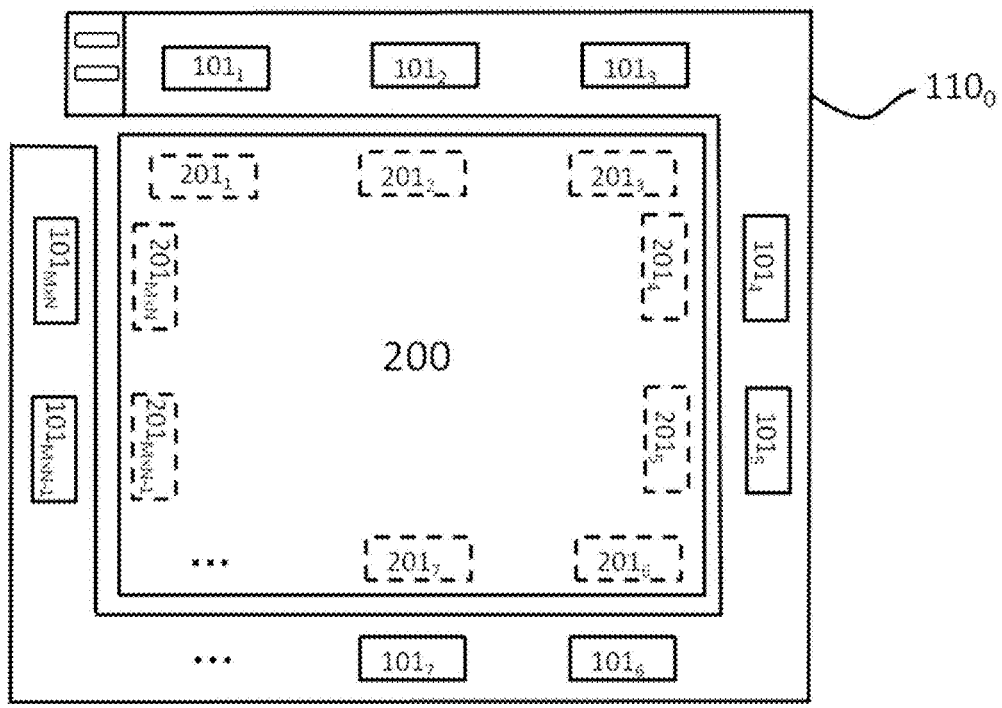
FIGS. 2A and 2B show schematic diagrams of position arrangements of light sources of the light-emitting device for the display screen according to an exemplary embodiment of the present application on the display screen.
Figure 2B:
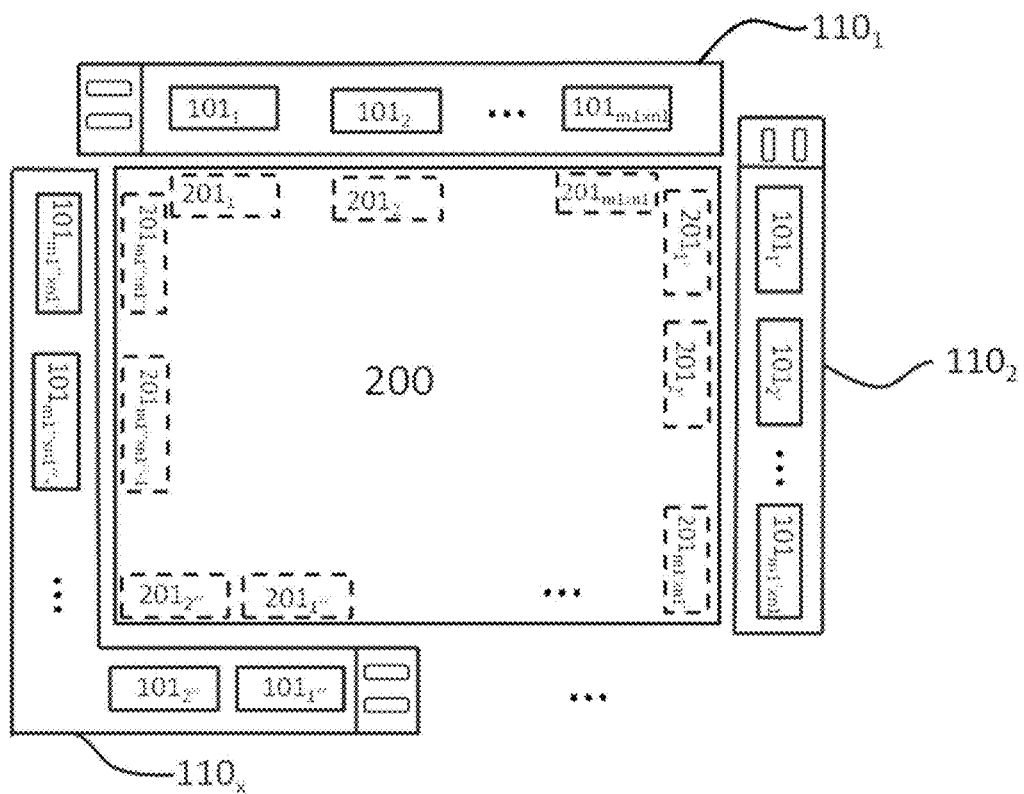

FIGS. 2A and 2B show schematic diagrams of position arrangement of light sources of the light-emitting device for the display screen according to an exemplary embodiment of the present application on the display screen. As shown in FIG. 2A, the light-emitting device 100 for the display screen includes M×N light sources $101_1$-$101_{M\times N}$ arranged in a single row on a strip $110_0$ (when no distinction is required, each light source $101_1$-$101_{M\times N}$ is referred to as a light source 101 below for short). The strip $110_0$ may be arranged along an outer edge of the display screen on the back of the display screen 200, such that each light source corresponds to a predetermined partial pixel area in the outermost periphery of a display area of the display screen 200. Specifically, each light source corresponds to a partial pixel area that corresponds to an arrangement position of the light source in the outermost periphery of the display area of the display screen 200.

It should be noted that, the single-row arrangement of the M×N light sources on the strip $110_0$ is only a preferred example, as the single-row arrangement is more suitable for accommodating those light sources in a single strip. However, the light sources may also be arranged in multiple rows on the strip $110_0$, as long as the strip $110_0$ may accommodate the M×N light sources. For example, the M×N light sources may also be evenly arranged in two rows or three rows on the strip $110_0$.

As shown in FIG. 2A, the light source $101_1$ corresponds to a partial pixel area $201_1$, the light source $101_2$ corresponds to a partial pixel area $201_2$, . . . and so on, the light source $101_{M\times N}$ corresponds to a partial pixel area $201_{M\times N}$ (when no distinction is required, each partial pixel area $201_1$-$201_{M\times N}$ will be referred to as 201 below for short).

In this way, the entirety of the light sources $101_1$-$101_{M\times N}$ corresponds to the outermost peripheral area of the display area of the display screen 200. Therefore, by making each light source 101 emit a color and brightness of the corresponding partial pixel area 201, the light emitted by the light source may change with the change in the color and brightness of the outermost peripheral area of the display area of the display screen 200. This effect seems to extend the boundary of the display area of the display screen 200, so that a viewer may obtain a more immersive viewing experience.

FIG. 2B shows a case where the light sources 101 of the light-emitting device 100 for the display screen are distributed on a plurality of strips. As shown in FIG. 2B, the light-emitting device 100 for the display screen includes a plurality of light sources 110 that are arranged in a single row on a plurality of strips $110_1$-$110_x$ (when no distinction is required, each of the strips $110_1$-$110_x$ will be referred to as a strip 110 below for short). Specifically, light sources $101_1$-$101_{m1\times n1}$ are arranged on the strip $110_1$, light sources $101_{1'}$-$101_{m1'\times n1'}$ are arranged on the strip $110_2$, and so on, and light sources $101_{1''}$-$101_{m1''\times n1''}$ are arranged on the strip $110_x$. When there are a plurality of strips, the length of each strip may be equal or unequal, and the number of light sources arranged on each strip may also be equal or unequal, as long as each strip is arranged along a part of the outer edge of the back of the motor, and each light source among the plurality of light sources corresponds to the predetermined partial pixel area in the outermost periphery of the display area of the display screen 200.

Similarly, the single-row arrangement of the plurality of light sources 101 on a single strip 110 is only a preferred embodiment. The plurality of light sources 101 may also be arranged in multiple rows on a single strip 110. It should be noted that, when the plurality of light sources 101 are arranged in multiple rows on a single strip 110, the plurality of light sources at a corresponding position (i.e., the same column position) in different rows correspond to the same predetermined partial pixel area in the outermost periphery of the display area of the display screen 200.

Similar to FIG. 2A, the entirety of the light sources $101_1$-$101_{m1\times n1}$, the light sources $101_{1'}$-$101_{m1'\times n1'}$, . . . , and the light sources $101_{1''}$-$101_{m1''\times n1''}$ in FIG. 2B may correspond to the outermost peripheral area of the display area of the display screen 200. Specifically, the light sources $101_1$-$101_{m1\times n1}$ correspond to the partial pixel areas $201_1$-$201_{m1\times n1}$, the light sources $101_{1'}$-$101_{m1'\times n1'}$ corresponds to the partial pixel areas $201_{1'}$-$201_{m1'\times n1'}$ and so on, and the light sources $101_{1''}$-$101_{m1''\times n1''}$ corresponds to the partial pixel areas $201_{1''}$-$201_{m1''\times n1''}$. By making each light source 101 emit the color and brightness of the corresponding partial pixel area 201, the light emitted by the light source 101 may change with the change in the color and brightness of the outermost peripheral area of the display area of the display screen 200, so that the viewer may obtain a more immersive viewing experience.

It should be noted that, in FIGS. 2A and 2B, for ease of viewing, the strip 110 is shown to be located on the periphery of the display screen 200.

In the prior art, the light-emitting device for the display screen is usually provided with a control line for each light source to individually control each light source, however, this causes a problem that the strip cannot accommodate a huge number of control lines when the number of light sources is large.

The invention point of the present application lies in that: instead of using an individual control line for each light source, several light sources on each strip are electrically connected in a matrix, and the control lines are only arranged in each row and each column of the matrix to individually control each light source in the matrix. For example, for a matrix with M rows and N columns, only M+N control lines are required to individually control the M×N light sources associated with the matrix, instead of using M×N control lines as in the prior art to individually control each light source. When there is a plurality of strips, similarly, each strip is associated with a matrix, and it is only necessary to arrange the control lines in each row and each column of all the matrices associated with all the strips, so as to individually control a plurality of light sources distributed on the plurality of strips.

Figure 3:
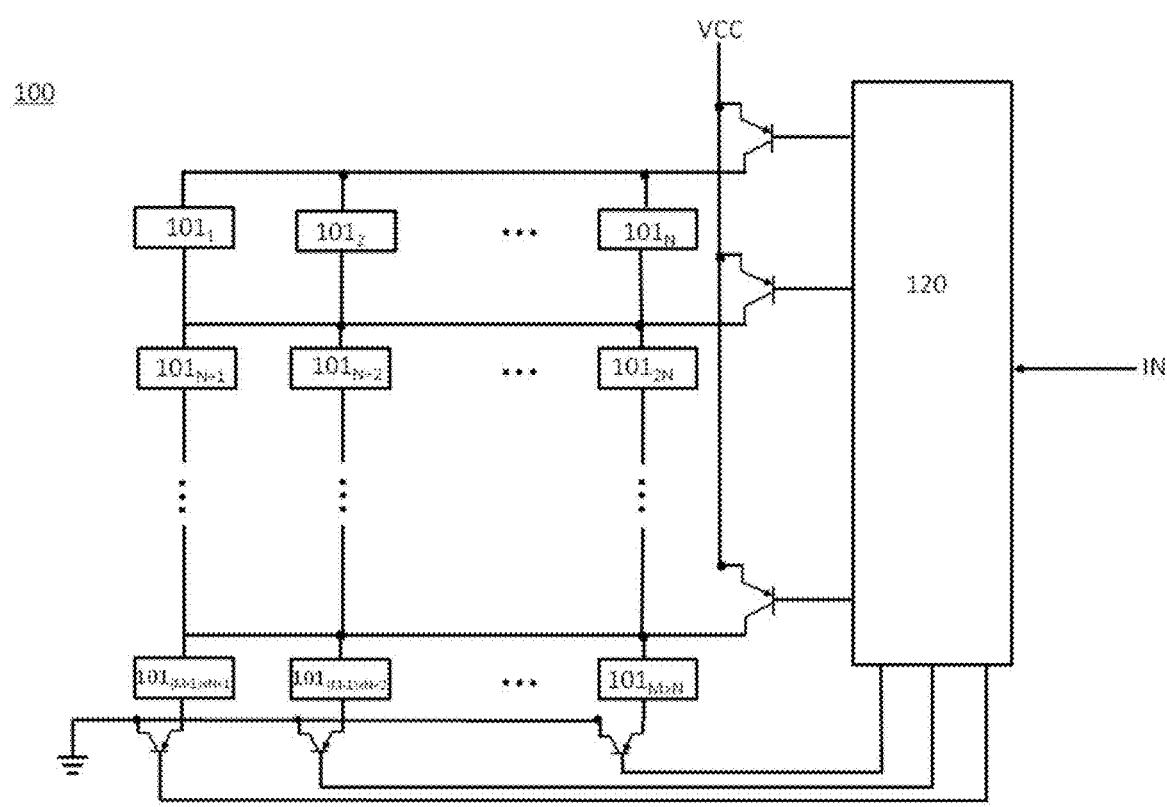
FIG. 3 shows a schematic diagram of an exemplary circuit connection of the light sources and a control unit of the light-emitting device for the display screen according to an embodiment of the present application.

Therefore, according to an embodiment of the present application, a light-emitting device for a display screen is proposed. FIG. 3 shows a schematic diagram of an exemplary circuit connection of light sources and a control unit of the light-emitting device for the display screen according to the embodiment of the present application. FIG. 3 only shows the circuit connection of the control unit 120 of the light-emitting device 100 for the display screen and the M×N light sources on one strip as an example. It should be understood that, when there are a plurality of strips, the control unit 120 is also connected to the matrix light sources on other strips in a similar manner.

With reference to FIG. 1 to FIG. 3, the light-emitting device 100 for the display screen includes:

a plurality of light sources 101 distributed on one or more strips 110, wherein several light sources among the plurality of light sources are arranged on each strip, the several light sources are electrically connected in a matrix manner in circuit, the number of rows and the number of columns of the matrix are both greater than 1, and each row and each column of the matrix are respectively provided with a control line to receive a corresponding control signal; and a control unit 120 having output lines corresponding to one or more matrices associated with the one or more strips, wherein each output line is connected to a corresponding row control line or column control line in a corresponding matrix, and the control unit 120 is configured to: acquire a video signal VSIGNAL from a signal source VSOURCE of the display screen 200, wherein the video signal is provided to the display screen 200 for display; determine color and brightness information of each light source among the plurality of light sources according to the video signal VSIGNAL, wherein each light source corresponds to a predetermined partial pixel area in the outermost periphery of a display area of the display screen 200; and for each matrix of the one or more matrices, sequentially control each row or each column of light sources in the matrix to emit light according to the corresponding color and brightness information within one light-emitting period.

According to the embodiment of the present application, a method of controlling a light-emitting device for a display screen is further proposed. The control method may be executed by the control unit 120 of the light-emitting device 100 for the display screen. The light-emitting device 100 for the display screen includes a plurality of light sources distributed on one or more strips, wherein several light sources among the plurality of light sources are arranged on each strip, the several light sources are electrically connected in a matrix manner in circuit, the number of rows and the number of columns of the matrix are both greater than 1, and each row and each column of the matrix are respectively provided with a control line to receive a corresponding control signal, and the control method includes:

acquiring a video signal VSIGNAL from a signal source VSOURCE of a display screen 200, wherein the video signal is provided to the display screen 200 for display;

determining color and/or brightness information of each light source among the plurality of light sources according to the video signal VSIGNAL, wherein each light source corresponds to a predetermined partial pixel area in the outermost periphery of a display area of the display screen; and for each matrix of the one or more matrices associated with the one or more strips, sequentially controlling each row or each column of light sources in the matrix to emit light according to the color and/or brightness information of corresponding display position within one light-emitting period.

In this way, for the several light sources on each strip, by only arranging the control lines in each row and each column of the matrix in which the several light sources are connected, it is possible to realize the individual control of each light source among the several light sources, thereby realizing the individual control of each light source among the plurality of light sources on the one or more strips with a reduced number of control lines.

In addition, in the present application, when the plurality of light sources are distributed on a plurality of strips, by reducing the number of light sources on a single strip, the number of control lines on a single strip may be further reduced, so that it is easy to accommodate the control lines in a strip with a limited width. Therefore, it is not only possible to realize the individual control of each light source among the plurality of light sources with the reduced number of control lines, but also possible to ensure that a strip with the limited width may accommodate the required control lines.

Further, in the embodiment of the present application, the matrix associated with each strip may have the same or different number of rows or columns. Therefore, the light-emitting periods T corresponding to different matrices may be the same or different. But it should be noted that, the light-emitting period T does not exceed 200 ms, for example, being 100 ms, 50 ms, 100 μs, 50 μs, 15 μs, 1 μs, and the like. This is because the shortest gaze time of human eyes is 200 ms, when the light-emitting period T does not exceed 200 ms, the human eyes will not feel flicker of the light source due to periodic refresh.

According to the embodiment of the present application, within one light-emitting period, for each matrix of the one or more matrices, sequentially controlling each row or each column of light sources in the matrix to emit light according to the corresponding color and brightness information within one light-emitting period includes: for each matrix of the one or more matrices, within one light-emitting period, sequentially controlling, according to a clock signal, each row or each column of light sources in the matrix to emit light in a preset light-emitting interval according to the corresponding color and brightness information.

The effect of the clock signal is to sequentially control each row or each column of light sources in the matrix in a time sequence to emit light according to the corresponding color and brightness information. Specifically, when the light-emitting period is T, for a matrix with M rows and N columns associated with a certain strip (M and N are both positive integers greater than 1, preferably, M and N are not 2 at the same time), and when each row of light sources in the matrix is sequentially controlled to emit light in the preset light-emitting interval according to the corresponding color and brightness information, the preset light-emitting interval may be less than or equal to T/M; and when each column of light sources in the matrix is sequentially controlled to emit light in the preset light-emitting interval according to the corresponding color and brightness information, the preset light-emitting interval may be less than or equal to T/N.

Sequentially controlling, according to the clock signal, each row of light sources to emit light in the preset light-emitting interval according to the corresponding color and brightness information may mean that determining, according to the current clock signal, a certain row of light sources to be currently controlled within the current light-emitting period T, and correspondingly controlling the row of light sources to emit light in the preset light-emitting interval (such as T/M) according to the corresponding color and brightness information. Similarly, when each column of light sources is controlled in sequence, a certain column of light sources to be currently controlled within the current light-emitting period T is determined according to the current clock signal, and the column of light sources is correspondingly controlled to emit light in the preset light-emitting interval (such as T/N) according to the corresponding color and brightness information. It should be noted that, the light sources do not necessarily emit light all the time throughout the light-emitting interval, but may emit light within a part or all of the light-emitting interval.

Correspondingly, the light-emitting device 100 for the display screen may include a clock generator or a clock source for providing the clock signal to the control unit. Alternatively, the light-emitting device 100 for the display screen may also receive the clock signal from an external clock generator or clock source. The light-emitting device 100 for the display screen may further include a receiver to receive the video signal VSIGNAL from the signal source VSOURCE of the display screen and transmit the same to the control unit 120. The light-emitting device 100 for the display screen may further include one or more strips 110 on which the plurality of light sources 101 are distributed.

According to the embodiment of the present application, sequentially controlling, according to the clock signal, each row of light sources in the matrix to emit light in the preset light-emitting interval according to the color and/or brightness information of corresponding display position includes: for a matrix with M rows and N columns in the one or more matrices, acquiring a current clock signal, determining the $m^{th}$ row of light sources corresponding to the current clock signal, m being a positive integer not greater than M, activating the $m^{th}$ row control line in response to determining the $m^{th}$ row of light sources, and for each of the $m^{th}$ row of light sources, controlling a column control line corresponding to the light source according to the color and brightness information corresponding to the light source, so that the light source emits light in the preset light-emitting interval according to the corresponding color and brightness information.

Activating the $m^{th}$ row control line in response to determining the $m^{th}$ row of light sources means: activating the $m^{th}$ row control line and not activating the remaining row control lines. As a result, in one light-emitting interval, only the N light sources in the $m^{th}$ row are controlled.

At this time, each light source of the N light sources in the $m^{th}$ row corresponds to one of N column control lines. Therefore, by controlling the column control line corresponding to a certain light source in the $m^{th}$ row according to the color and brightness information corresponding to the light source, it is possible to cause the light source to emit light in the preset light-emitting interval according to the corresponding color and brightness information. By controlling the N column control lines, each of the N light sources in the $m^{th}$ row may emit light in the preset light-emitting interval according to the color and/or brightness information of corresponding display screen.

Similarly, according to the embodiment of the present application, sequentially controlling, according to the clock signal, each column of light sources in the matrix to emit light in the preset light-emitting interval according to the color and/or brightness information of corresponding display screen includes: for a matrix with M rows and N columns in the one or more matrices, acquiring a current clock signal, determining the $n^{th}$ column of light sources corresponding to the current clock signal, n being a positive integer not greater than N, activating the $n^{th}$ column control line in response to determining the $n^{th}$ column of light sources, and for each of the $n^{th}$ column of light sources, controlling a row control line corresponding to the light source according to the color and/or brightness information corresponding to the light source, so that the light source emits light in the preset light-emitting interval according to the color and/or brightness information of corresponding display position.

In this way, for each matrix, each row or each column of light sources of the matrix may be sequentially controlled according to the clock signal to emit light within one light-emitting period, thereby realizing the individual control for each light source in the matrix within one light-emitting period.

According to the embodiment of the present application, for each light source among the plurality of light sources, the light source emits light when the row control line and the column control line corresponding to the light source are both activated, and does not emit light when either of the row control line and the column control line corresponding to the light source is not activated.

Therefore, when the $m^{th}$ row control line is activated, the light emission of the $m^{th}$ row of light sources depends on the control signals on the corresponding N column control lines. Similarly, when the $n^{th}$ column control line is activated, the light emission of the $n^{th}$ column of light sources depends on the control signals on the corresponding M row control lines.

In particular, when each light source includes a plurality of light-emitting diodes connected in parallel to the same row control line, the column control line corresponding to the light source includes a plurality of sub-column control lines corresponding to the plurality of light-emitting diodes. When any sub-column control line included in the column control line is activated, the column control line corresponding to the light source is activated. Correspondingly, when each light source includes a plurality of light-emitting diodes connected in parallel to the same column control line, the row control line corresponding to the light source includes a plurality of sub-row control lines corresponding to the plurality of light-emitting diodes. When any sub-row control line included in the row control line is activated, the row control line corresponding to the light source is activated.

According to the embodiment of the present application, each light source among the plurality of light sources includes a light-emitting diodes connected in parallel to the same row control line or the same column control line, and a is a positive integer.

In this way, each light source includes at least one light-emitting diode. The light-emitting diodes are arranged in any number, such that each light source may emit monochromatic light with varying brightness or color temperature, or emit colored light with both varying brightness and/or color. For example, by using one light-emitting diode, the light source may emit monochromatic light with varying brightness, that is, the brightness of each light source may change according to the brightness of the corresponding partial pixel area. By using two light-emitting diodes, the light source may emit monochromatic light with a varying color temperature, or partial colored light with both varying brightness and/or color. By using at least three light-emitting diodes, the light source may emit any colored light with both varying brightness and/or color. For example, each light source may be a combination of three light-emitting diodes of red R, green G and blue B, a combination of three light-emitting diodes of cyan C, magenta M and yellow Y, or a combination of four light-emitting diodes of red R, yellow Y, green G and blue B, etc.

It should be noted that, in the present application, when a=1, that is, when one light source includes only one light-emitting diode, each column of light sources or each row of light sources in the matrix may be sequentially controlled to emit light in the preset light-emitting interval according to the clock signal. When a>1, if a light-emitting diodes are connected in parallel to the same row control line, each row of light sources in the matrix may be sequentially controlled to emit light in the preset light-emitting interval according to the clock signal; and if a light-emitting diodes are connected in parallel to the same column control line, each column of light sources in the matrix may be sequentially controlled to emit light in the preset light-emitting interval according to the clock signal.

Next, the case where each light source includes a light-emitting diodes connected in parallel to the same row control line is described.

According to the embodiment of the present application, when each light source includes a light-emitting diodes connected in parallel to the same row control line, for each column control line in each matrix: the column control line includes a parallel sub-column control lines, and the output line corresponding to the column control line in the control unit includes a sub-column output lines, so that each sub-column output line is connected to a corresponding sub-column control line in the column control line.

In this way, the individual control of each light-emitting diode in each light source may be realized, thereby realizing the individual control of the light emission of each light source.

At this time, for the M×N light sources in the M×N matrix, a total of M+aN control lines are required for control. Compared with the M×aN control lines required in the prior art, the number of required control lines is greatly reduced, therefore, it is beneficial to use the strip with the limited width to accommodate and control a greater number of light sources, so as to perform more precise light-emitting control or adapt to a display screen with a greater size.

Further, according to the embodiment of the present application, for each of the $m^{th}$ row of light sources, controlling the column control line corresponding to the light source according to the color and brightness information corresponding to the light source, so that the light source emits light in the preset light-emitting interval according to the corresponding color and brightness information includes: for each of the $m^{th}$ row of light sources, controlling the sub-column control lines corresponding to the light source according to the color and brightness information corresponding to the light source, so that the light source emits light in the preset light-emitting interval according to the corresponding color and brightness information.

At this time, the N column control lines are expanded into aN sub-column control lines. For each of the $m^{th}$ row of light sources, by controlling the sub-column control lines corresponding to a certain light source, it is possible to cause the light source to emit light in the preset light-emitting interval according to the corresponding color and brightness information.

Further, according to the embodiment of the present application, controlling the sub-column control lines corresponding to the light source according to the color and brightness information corresponding to the light source, so that the light source emits light in the preset light-emitting interval according to the corresponding color and brightness information includes: for the $n'^{th}$ light source in the $m^{th}$ row of light sources, n' being a positive integer not greater than N, determining, according to the color information corresponding to the light source, to activate which sub-column control lines among the $(a(n'-1)+1)^{th}$ sub-column control line to the $(an')^{th}$ sub-column control line corresponding to the light source, and determining, according to the brightness information corresponding to the light source, activation periods of some sub-column control lines that are determined to be activated in the preset light-emitting interval, wherein the higher the brightness indicated by the brightness information corresponding to the light source is, the longer the activation periods of the some sub-column control lines in the preset light-emitting interval are.

Specifically, for the $n'^{th}$ light source in the $m^{th}$ row of light sources, the color information corresponding to the light source determines which of the sub-column control lines corresponding to the light source are to be activated or which of the corresponding a light-emitting diodes are about to emit light. Those sub-column control lines are a subset of the sub-column control lines. For example, those sub-column control lines may be zero sub-column control line (when the corresponding color information is black, all the diodes do not emit light), one sub-column control line (for example, when the light source is an RGB LED, if the corresponding color information is red, only the red light-emitting diode emits light), a plurality of sub-column control lines, or all of the sub-column control lines (for example, when the light source is an RGB LED, if the corresponding color information is purple, all the three light-emitting diodes emit light).

Further, when the color information corresponding to the light source determines that more than one sub-column control line in the sub-column control lines corresponding to the light source is activated, the color information further determines a ratio of the activation periods of those activated sub-column control lines. This is because the magnitude of a color component is represented by a light-emitting duration. For example, in the case where the light source is an RGB LED, when the color information is purple, since the RGB value of purple is (160, 32, 240), it is necessary to control the ratio of the light-emitting durations of RLED, GLED and BLED to be 160:32:240 in the preset light-emitting interval, so as to emit purple light.

The color information may determine the ratio of the activation periods of the plurality of sub-column control lines that are determined to be activated, however, it cannot determine an absolute light-emitting duration.

In the preset light-emitting interval (for example, T/M), the light-emitting duration of the light-emitting diode of the light source is determined by the brightness information. The activation periods of those sub-column control lines that are determined to be activated are determined by the brightness information, so as to determine the light-emitting duration of the light-emitting diode. This is because, in the preset light-emitting interval, the longer the activation period of the sub-column control line (the greater the duty cycle occupied by the activation period is) is, the longer the light-emitting duration of the light-emitting diode is, and thus the higher the brightness of the emitted light is. For example, when a certain light source is to emit high-brightness purple light in the case of the RGB LED, while the light-emitting duration does not exceed the preset lighting interval T/M, and the ratio of the light-emitting durations of RLED, GLED and BLED is 160:32:240, the longer light-emitting duration of each of the RLED, GLED and BLED is, the brighter the purple light emitted by the light source is.

According to the embodiment of the present application, for each light-emitting diode in each light source among the plurality of light sources: the light-emitting diode emits light when the row control line and the sub-column control line (when the diodes are connected in parallel to the same row control line) corresponding to the light-emitting diode are both activated, and does not emit light when either of the row control line and the sub-column control line corresponding to the light-emitting diode is not activated.

In this way, when the N light sources in the $m^{th}$ row are controlled to emit light according to the corresponding color and brightness information, by activating the $m^{th}$ row control line, and differently activating the aN sub-column control lines according to the color and brightness information corresponding to the light-emitting diodes of the N light sources, it is possible to realize different light emission for the N light sources in the $m^{th}$ row.

Further, according to the embodiments of the present application, in order to realize that a light-emitting diode emits light only when the row control line and the sub-column control line corresponding to the light-emitting diode are both activated, the M×aN matrix of the light-emitting diode may have the following electrical connection: for each sub-column control line in each matrix,
the sub-column control line is connected to a constant high level VCC (such as a constant voltage source) or a constant low level (such as grounding) through a corresponding sub-column switch, the sub-column output line corresponding to the sub-column control line in the control unit is connected to a control electrode (for example, it is a gate electrode, when the switch is an MOS transistor) of the sub-column switch, and the sub-column control line is activated when the corresponding sub-column switch is closed.

At this time, for each row control line in each matrix: when each sub-column control line is connected to a constant high level through a corresponding sub-column switch, the row control line is connected to a constant low level through a corresponding row switch; and when each sub-column control line is connected to a constant low level through a corresponding sub-column switch, the row control line is connected to a constant high level through a corresponding row switch, wherein a row output line corresponding to the row control line in the control unit is connected to the control electrode of the row switch, and the row control line is activated when the corresponding row switch is closed.

By means of this electrical connection, each sub-column control line is activated when the corresponding sub-column switch is closed, and each row control line is activated when the corresponding row switch is closed. For example, if the row switch and the sub-column switch are closed at a high level of the control electrode, then each sub-column control line is activated when the corresponding sub-column output line outputs a high level, and each row control line is activated when the corresponding row output line outputs a high level. Therefore, it is possible to realize that the corresponding light-emitting diode is activated to emit light when the row output line and the sub-column output line of the corresponding control unit both output high levels.

What has been described above is the case where each light source includes a light-emitting diodes connected in parallel to the same row control line. The case is similar when each light source includes a light-emitting diodes connected in parallel to the same column control line, as described below.

When each light source includes a light-emitting diodes connected in parallel to the same column control line, for each row control line in each matrix: the row control line includes a parallel sub-row control lines, and the output line corresponding to the row control line in the control unit includes a sub-row output lines, so that each sub-row output line is connected to a corresponding sub-row control line in the row control line.

Further, according to one embodiment of the present application, when each light source includes a light-emitting diodes connected in parallel to the same column control line, for each of the $n^{th}$ column of light sources, controlling the row control line corresponding to the light source according to the color and brightness information corresponding to the light source, so that the light source emits light in the preset light-emitting interval according to the corresponding color and brightness information includes: for the $m'^{th}$ light source in the $n^{th}$ column of light sources, m' being a positive integer not greater than M,
determining, according to the color information corresponding to the light source, to activate which sub-row control lines among the $(a(m'-1)+1)^{th}$ sub-row control line to the $(am')^{th}$ sub-row control line corresponding to the light source, and
determining, according to the brightness information corresponding to the light source, activation periods of some sub-row control lines that are determined to be activated in the preset light-emitting interval,
wherein the higher the brightness indicated by the brightness information corresponding to the light source is, the longer the activation periods of some of the sub-row control lines in the preset light-emitting interval are.

At this time, for each light-emitting diode in each light source among the plurality of light sources: the light-emitting diode emits light when the sub-row control line and the column control line corresponding to the light-emitting diode are both activated, and does not emit light when either of the sub-row control line and the column control line corresponding to the light-emitting diode is not activated.

At this time, for each sub-row control line in each matrix: the sub-row control line is connected to a constant high level or a constant low level through a corresponding sub-row switch, and the sub-row output line corresponding to the sub-row control line in the control unit is connected to the control electrode of the sub-row switch, and the sub-row control line is activated when the corresponding sub-row switch is closed.

Correspondingly, for each column control line: when each sub-row control line is connected to a constant high level through a corresponding sub-row switch, the column control line is connected to a constant low level through a corresponding column switch; and when each sub-row control line is connected to a constant low level through a corresponding sub-row switch, the column control line is connected to a constant high level through a corresponding column switch, wherein the column output line corresponding to the column control line in the control unit is connected to the control electrode of the column switch, and the column control line is activated when the corresponding column switch is closed.

In addition, according to the embodiment of the present application, each light-emitting diode in each light source may include a plurality of identical sub-light-emitting diodes. In other words, each light-emitting diode may be composed of a plurality of identical sub-light-emitting diodes connected in series. In this way, the number of light-emitting diodes in the light source may be expanded, so that the light source may emit light with higher brightness.

In addition, according to the embodiment of the present application, determining the color and brightness information of each light source among the plurality of light sources according to the video signal includes: for each light source, acquiring, from the video signal, the color and brightness information of each pixel in the partial pixel area corresponding to the arrangement position of the light source, taking an RGB color gamut median color, an HSV color gamut median color, an RGB color gamut average color, or an HSV color gamut average color of all the pixels in the partial pixel area as the color information of the light source, and taking the highest brightness, the lowest brightness, the median brightness or the average brightness of all the pixels in the partial pixel area as the brightness information of the light source.

Further, for each light source, it is possible to take the RGB color gamut median color, the HSV color gamut median color, the RGB color gamut average color, or the HSV color gamut average color of all the pixels in the corresponding partial pixel area within one light-emitting period as the color information of the light source within the current light-emitting period, and similarly, it is possible to take the highest brightness, the lowest brightness, the median brightness or the average brightness of all the pixels in the partial pixel area within one light-emitting period as the brightness information of the light source within the current light-emitting period.

In this way, it is possible to determine the color and brightness of each light source among the plurality of light sources, so that the color and brightness of each light source may change with a change in the corresponding partial pixel area.

Figure 4:
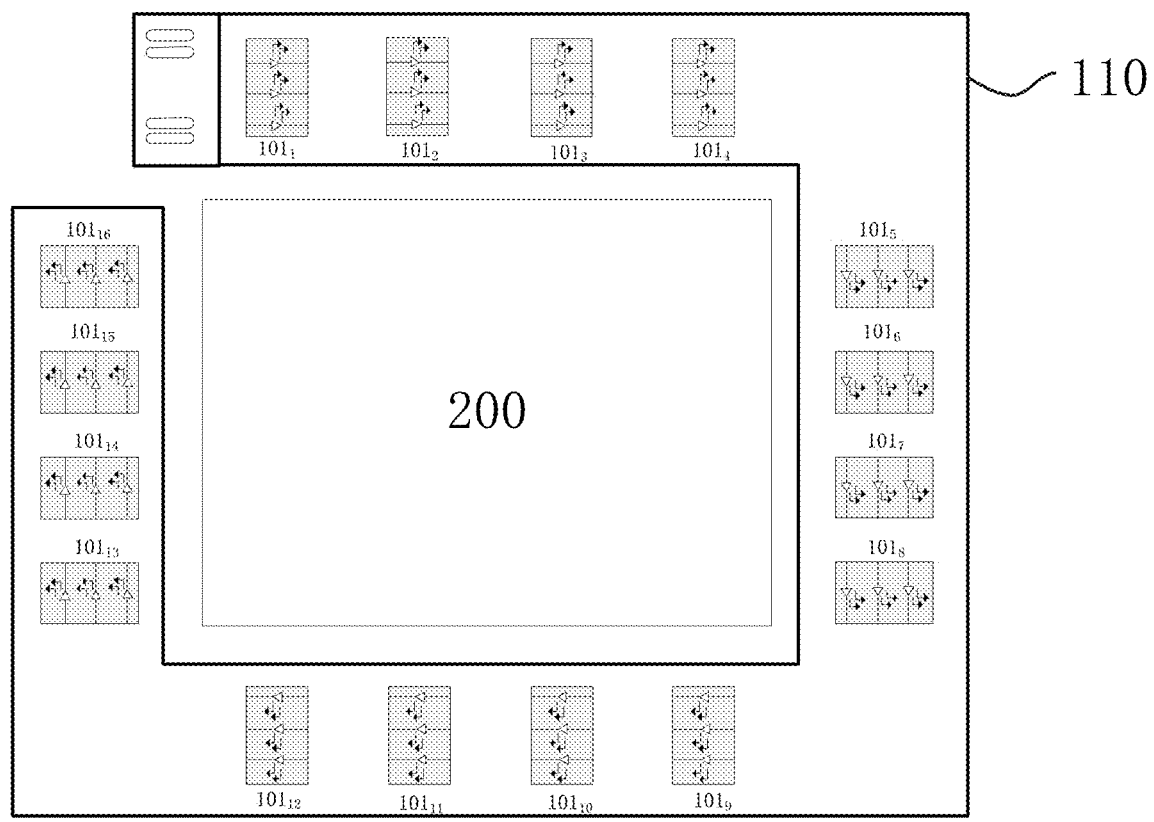
FIG. 4 shows a schematic diagram of the position arrangement of the light sources of the light-emitting device for the display screen according to an exemplary embodiment of the present application on the display screen.
Figure 5:
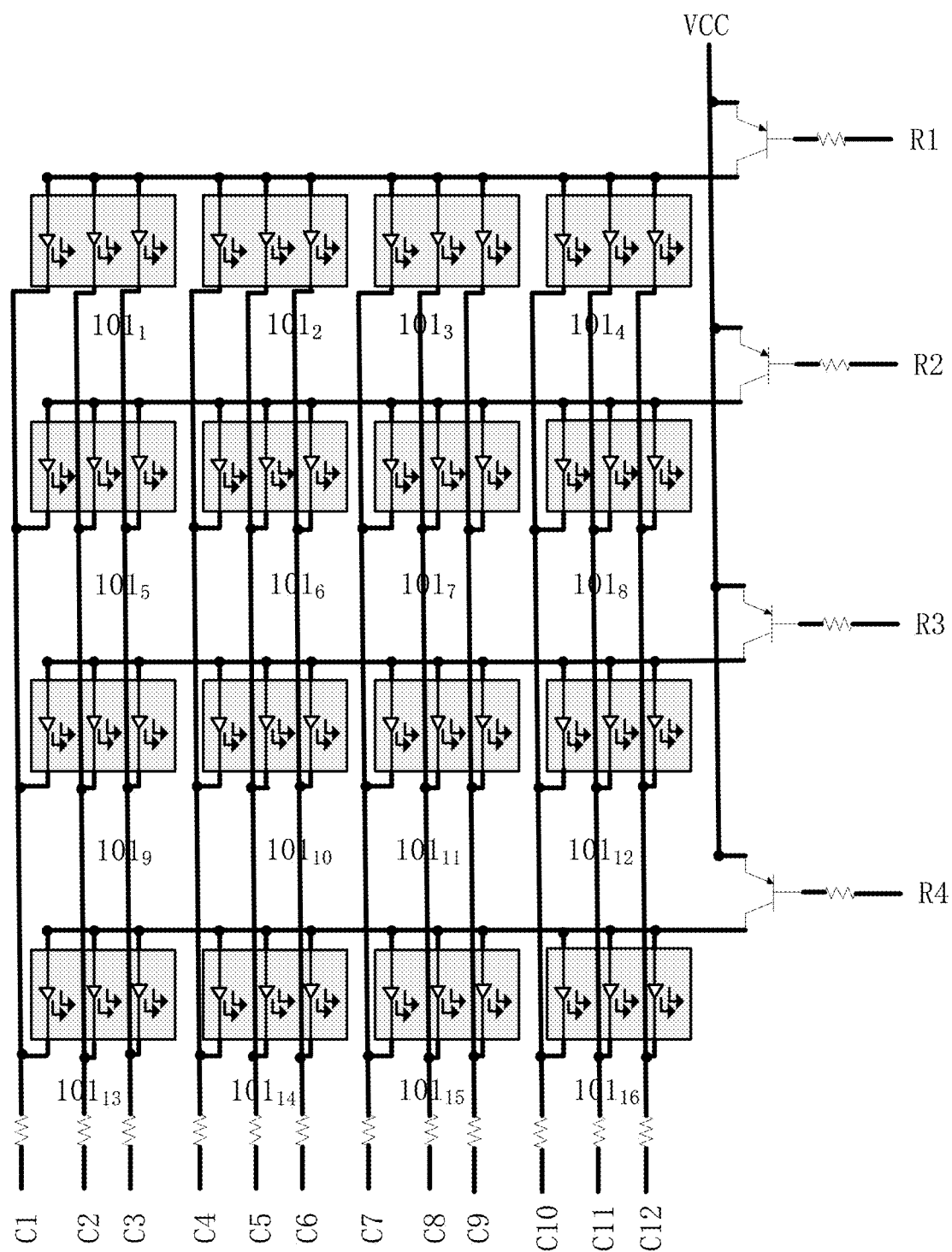
FIG. 5 shows a schematic diagram of an exemplary circuit connection corresponding to the light sources shown in FIG. 4.

Next, referring to FIG. 4 and FIG. 5, the technical solution of the present application is described by taking the light sources of 16 RGB LEDs as an example. FIG. 4 shows a schematic diagram of the position arrangement of the light sources of the light-emitting device for the display screen according to an exemplary embodiment of the present application on the display screen, and FIG. 5 shows a schematic diagram of an exemplary circuit connection corresponding to the light sources shown in FIG. 4. It should be noted that, for ease of description, FIG. 4 only shows one strip 110 for the display screen 200, and correspondingly, FIG. 5 shows a schematic diagram of the circuit connection of the light sources on a single strip. When there is a plurality of strips 110 surrounding the display screen, the plurality of strips are sequentially connected to surround the display screen 200 for a circle, and several light sources on each strip are arranged in a matrix as shown in FIG. 5.

As shown in FIG. 4, sixteen (16) light sources $101_1$-$101_{16}$ are arranged in a single row on the strip 110 to be attached to the outer edge of the back of the display screen 200. It should be noted that the single-row arrangement is only an example, and the light sources may also be arranged in multiple rows on the strip 110. Generally, those light sources roughly cover the entire periphery of the display screen to correspond to the outermost peripheral area of the display area of the display screen 200. Similar to FIGS. 2A and 2B, the strip 110 is shown as being located on the periphery of the display screen 200 for ease of viewing. It should be noted that the arrangement of four (4) light sources on each side of the display screen shown in FIG. 4 is only an example, and the actual number of light sources arranged on each side depends on the side length of the display screen and the size of the light source used.

Since the length of the strip is fixed, and it is known that each light source occupies the same length L on the strip, the position range of a light source on the strip may be determined according to the serial number of the light source. Since the strip 110 roughly covers the entire periphery of the display screen, the partial pixel area corresponding to the light source may be regarded as the partial pixel area corresponding to the length L in the outermost periphery of the display area of the display screen 200.

In this way, as long as an attachment starting position of the strip is determined, the partial pixel area in the outermost peripheral area of the display area corresponding to each light source may be determined. For example, when the strip is attached starting from the back of a top left corner of the display screen shown in FIG. 4 fixedly, the light source $101_1$ corresponds to the partial pixel area with a position range of 0-L starting from the top left corner in the outermost peripheral area of the display area, the light source $101_2$ corresponds to the partial pixel area with a position range of L-2L starting from the top left corner in the outermost peripheral area of the display area, . . . , and so on, the light source $101_{16}$ corresponds to the partial pixel area with a position range of 15L-16L starting from the top left corner in the outermost peripheral area of the display area, and the partial pixel area corresponding to the light source $101_{16}$ have roughly returned to the top left corner.

It should be noted that, the top left corner is only an example of the attachment starting position, and the strip may also be attached starting from a lower left corner or other positions of the display screen. As long as the length of the strip is predetermined to match a perimeter of the display screen, and the attachment starting position is fixed in advance, and then the partial pixel area in the outermost peripheral area of the display area corresponding to each light source on the strip may be predetermined.

Further, the length of the strip depends on the number of light sources. For example, when the light source is an RGB LED, depending on the model number of the light source, a strip of 1m includes about 30 to 120 light sources. Therefore, after the type of the used light sources is determined, the strip with an appropriate length may be selected according to the perimeter of the display screen to be adapted. For example, when the display screen 200 is a 60-inch, 65-inch or 70-inch television, the length of the strip that the display screen may adapt to is about 5 m, and the number of corresponding light sources ranges from 150 to 600.

As shown in FIG. 5, the light sources $101_1$-$101_{16}$ on the strip 110 are electrically connected in a 4×4 matrix. Each light source 101 is composed of a red light-emitting diode RLED, a green light-emitting diode GLED, and a blue light-emitting diode BLED. The three light-emitting diodes of each light source 101 are connected in parallel to the same row control line. Therefore, each light source corresponds to one row control line and three column control lines, so that the 4×4 light source matrix is expanded into a 4×12 light-emitting diode matrix. The row output lines R1-R4 of the control unit 120 (not shown) are respectively connected to the control electrodes (such as the gate electrodes) of the row switches of the corresponding rows, and the sub-column output lines C1-C12 of the control unit 120 are respectively connected to the control electrodes of the sub-column switches of the corresponding sub-columns (for simplicity, the sub-column switches are not shown in FIG. 5).

As shown in FIG. 1, the control unit 120 may acquire the video signal VSIGNAL from the video signal source VSOURCE of the display screen 200, and determine the color and brightness information of each light source among the light sources $101_1$-$101_{16}$ according to the video signal VSIGNAL; and then within one light-emitting period T, according to the acquired clock signal, sequentially control the light sources in the first row to the fourth row to emit light according to the corresponding color and brightness information in the light-emitting interval of T/4. Since the light-emitting control method has been described in detail according to FIG. 2 and FIG. 3, it will not be repeated here.

It should be noted that FIG. 5 only shows one matrix electrical connection of the sixteen (16) light sources $101_1$-$101_{16}$. The sixteen (16) light sources $101_1$-$101_{16}$ may also be electrically connected in a 2×8 matrix. Further, when the number of light sources on each strip is tens or hundreds, those light sources may be in multiple matrix electrical connection manners, as long as the number of rows and the number of columns of the matrix are both greater than 1. When the number of rows and the number of columns of the matrix are both greater than 1, and the light sources are not connected in a 2×2 matrix, the number of required control lines may be reduced, while realizing the independent light-emitting control of each light source.

It should be noted that, the terms used here are only for describing specific embodiments, and are not intended to limit the exemplary embodiments according to the present application. As used herein, unless the context clearly indicates otherwise, the singular form is also intended to include the plural form, and in addition, it should also be understood that, when the terms "comprising" and/or "including" are used in this specification, they indicate the presence of features, steps, works, devices, components, and/or combinations thereof.

It should be illustrated that, the terms "first" and "second" and the like in the specification and claims of the present application and the above-mentioned drawings are used for distinguishing similar objects, and are not necessarily used for describing a specific sequence or precedence order. It should be understood that the data used in this way may be interchanged under appropriate circumstances, so that the embodiments of the present application described herein may be implemented in a sequence other than those illustrated or described herein.

The foregoing descriptions are only preferred embodiments of the present application, and are not intended to limit the present application, and for those skilled in the art, the present application may have various modifications and changes. Any modifications, equivalent replacements, improvements and the like, made within the spirit and principle of the present application, shall all be included in the protection scope of the present application.

What we claim is:

1. A light-emitting device for a display screen, wherein the light-emitting device comprises:
    a plurality of light sources distributed on one or more strips, wherein several light sources among the plurality of light sources are arranged on each strip, the several light sources are electrically connected in a matrix manner in circuit, and each row and each column of the matrix are respectively provided with a control line to receive a corresponding control signal; and
    a control unit having output lines corresponding to one or more matrices associated with the one or more strips, wherein each output line is connected to a corresponding row control line or column control line in a corresponding matrix, and the control unit is configured to:
    acquire a video signal from a signal source of the display screen, wherein the video signal is provided to the display screen for display;
    determine color and brightness information of each light source among the plurality of light sources according to the video signal, wherein each light source corresponds to a predetermined partial pixel area in the outermost periphery of a display area of the display screen; and
    for each matrix of the one or more matrices, control each row or each column of light sources in the matrix to emit light according to the color and/or brightness information of corresponding display position within one light-emitting period.

2. The light-emitting device for the display screen according to claim 1, wherein for each matrix of the one or more matrices, sequentially controlling each row or each column of light sources in the matrix to emit light according to the corresponding color and/or brightness information within one light-emitting period comprises: for each matrix of the one or more matrices, within one light-emitting period, controlling, according to a clock signal, each row or each column of light sources in the matrix to emit light in a preset light-emitting interval according to the color and/or brightness information of corresponding display position.

3. The light-emitting device for the display screen according to claim 2, wherein,
    sequentially controlling, according to the clock signal, each row of light sources in the matrix to emit light in the preset light-emitting interval according to the corresponding color and brightness information comprises: for a matrix with M rows and N columns in the one or more matrices,
        acquiring a current clock signal,
        determining the $m^{th}$ row of light sources corresponding to the current clock signal, m being a positive integer not greater than M,
        activating the $m^{th}$ row control line in response to determining the $m^{th}$ row of light sources, and
        for each of the $m^{th}$ row of light sources, controlling a column control line corresponding to the light source according to the color and brightness information corresponding to the light source, so that the light source emits light in the preset light-emitting interval according to the corresponding color and brightness information; and/or
    sequentially controlling, according to the clock signal, each column of light sources in the matrix to emit light in the preset light-emitting interval according to the corresponding color and brightness information comprises: for a matrix with M rows and N columns in the one or more matrices,
        acquiring a current clock signal,
        determining the $n^{th}$ column of light sources corresponding to the current clock signal, n being a positive integer not greater than N,
        activating the $n^{th}$ column control line in response to determining the $n^{th}$ column of light sources, and
        for each of the nth column of light sources, controlling a row control line corresponding to the light source according to the color and brightness information corresponding to the light source, so that the light source emits light in the preset light-emitting interval according to the corresponding color and brightness information.

4. The light-emitting device for the display screen according to claim 1, wherein for each light source among the plurality of light sources:
    the light source emits light when the row control line and the column control line corresponding to the light source are both activated, and does not emit light when either of the row control line and the column control line corresponding to the light source is not activated.

5. The light-emitting device for the display screen according to claim 3, wherein each light source among the plurality of light sources comprises light-emitting diodes connected in parallel to the same row control line or the same column control line, and a is a positive integer.

6. The light-emitting device for the display screen according to claim 5, wherein when each light source comprises the light-emitting diodes connected in parallel to the same row control line, for each column control line in each matrix:
the column control line comprises parallel sub-column control lines, and the output line corresponding to the column control line in the control unit comprises a sub-column output lines, so that each sub-column output line is connected to a corresponding sub-column control line in the column control line.

7. The light-emitting device for the display screen according to claim 6, wherein for each of the $m^{th}$ row of light sources, controlling the column control line corresponding to the light source according to the color and brightness information corresponding to the light source, so that the light source emits light in the preset light-emitting interval according to the corresponding color and brightness information comprises:
for each of the $m^{th}$ row of light sources, controlling the sub-column control lines corresponding to the light source according to the color and brightness information corresponding to the light source, so that the light source emits light in the preset light-emitting interval according to the corresponding color and brightness information.

8. The light-emitting device for the display screen according to claim 7, wherein controlling the sub-column control lines corresponding to the light source according to the color and brightness information corresponding to the light source, so that the light source emits light in the preset light-emitting interval according to the corresponding color and brightness information comprises: for the $n'^{th}$ light source in the $m^{th}$ row of light sources, n' being a positive integer not greater than N,
determining, according to the color information corresponding to the light source, to activate which sub-column control lines among the $(a(n'-1)+1)^{th}$ sub-column control line to the $(an')^{th}$ sub-column control line corresponding to the light source, and
determining, according to the brightness information corresponding to the light source, activation periods of some sub-column control lines that are determined to be activated in the preset light-emitting interval,
wherein the higher the brightness indicated by the brightness information corresponding to the light source is, the longer the activation periods of some of the sub-column control lines in the preset light-emitting interval are.

9. The light-emitting device for the display screen according to claim 6, wherein for each light-emitting diode in each light source among the plurality of light sources:
the light-emitting diode emits light when the row control line and the sub-column control line corresponding to the light-emitting diode are both activated, and does not emit light when either of the row control line and the sub-column control line corresponding to the light-emitting diode is not activated.

10. The light-emitting device for the display screen according to claim 9, wherein for each sub-column control line in each matrix:
the sub-column control line is connected to a constant high level or a constant low level through a corresponding sub-column switch,
the sub-column output line corresponding to the sub-column control line in the control unit is connected to a control electrode of the sub-column switch, and
the sub-column control line is activated when the corresponding sub-column switch is closed.

11. The light-emitting device for the display screen according to claim 10, wherein for each row control line in each matrix:
when each sub-column control line is connected to a constant high level through a corresponding sub-column switch, the row control line is connected to a constant low level through a corresponding row switch; and
when each sub-column control line is connected to a constant low level through a corresponding sub-column switch, the row control line is connected to a constant high level through a corresponding row switch, and
wherein a row output line corresponding to the row control line in the control unit is connected to the control electrode of the row switch, and the row output line is activated when the corresponding row switch is closed.

12. The light-emitting device for the display screen according to claim 5, wherein when each light source comprises the light-emitting diodes connected in parallel to the same column control line, for each row control line in each matrix:
the row control line comprises parallel sub-row control lines, and the output line corresponding to the row control line in the control unit comprises a sub-row output lines, so that each sub-row output line is connected to a corresponding sub-row control line in the row control line.

13. The light-emitting device for the display screen according to claim 12, wherein for each of the $n^{th}$ column of light sources, controlling the row control line corresponding to the light source according to the color and brightness information corresponding to the light source, so that the light source emits light in the preset light-emitting interval according to the corresponding color and brightness information comprises: for the $M'^{th}$ light source in the nth column of light sources, m' being a positive integer not greater than M,
determining, according to the color information corresponding to the light source, to activate which sub-row control lines among the $(a(m'-1)+1)^{th}$ sub-row control line to the $(am')^{th}$ sub-row control line corresponding to the light source, and
determining, according to the brightness information corresponding to the light source, activation periods of some sub-row control lines that are determined to be activated in the preset light-emitting interval,
wherein the higher the brightness indicated by the brightness information corresponding to the light source is, the longer the activation periods of some of the sub-row control lines in the preset light-emitting interval are.

14. The light-emitting device for the display screen according to claim 5, wherein each light-emitting diode among the light-emitting diodes comprises a plurality of identical sub-light-emitting diodes.

15. The light-emitting device for the display screen according to claim 5, wherein each light source among the plurality of light sources comprises a red light-emitting diode, a green light-emitting diode, and a blue light-emitting diode.

16. The light-emitting device for the display screen according to claim 1, wherein each strip of the one or more strips is arranged along a part of the outer edge of the back of the display screen, so that each light source among the plurality of light sources corresponds to the partial pixel area, which corresponds to the arrangement position of the light source, in the outermost periphery of the display area of the display screen.

17. The light-emitting device for the display screen according to claim 16, wherein determining the color and brightness information of each light source among the plurality of light sources according to the video signal comprises: for each light source,
acquiring, from the video signal, the color and brightness information of each pixel in the partial pixel area corresponding to the arrangement position of the light source,
taking an RGB color gamut median color, an HSV color gamut median color, an RGB color gamut average color, or an HSV color gamut average color of all the pixels in the partial pixel area as the color information of the light source, and
taking the highest brightness, the lowest brightness, the median brightness or the average brightness of all the pixels in the partial pixel area as the brightness information of the light source.

18. A method of controlling a light-emitting device for a display screen, wherein the light-emitting device comprises a plurality of light sources distributed on one or more strips, wherein several light sources among the plurality of light sources are arranged on each strip, the several light sources are electrically connected in a matrix manner in circuit, and each row and each column of the matrix are respectively provided with a control line to receive a corresponding control signal, and the control method comprises:
acquiring a video signal from a signal source of the display screen, wherein the video signal is provided to the display screen for display;
determining color and/or brightness information of each light source among the plurality of light sources according to the video signal, wherein each light source corresponds to a predetermined partial pixel area in the outermost periphery of a display area of the display screen; and
for each matrix of the one or more matrices associated with the one or more strips, controlling each row or each column of light sources in the matrix to emit light according to the color and/or brightness information of corresponding display position within one light-emitting period.

19. The control method according to claim 18, wherein for each matrix of the one or more matrices, controlling each row or each column of light sources in the matrix to emit light according to the color and/or brightness information of corresponding display position within one light-emitting period comprises: for each matrix of the one or more matrices, within one light-emitting period, controlling, according to a clock signal, each row or each column of light sources in the matrix to emit light in a preset light-emitting interval according to the color and/or brightness information of corresponding display position.

20. The control method according to claim 19, wherein each row and each column in each matrix are respectively provided with a control line to receive a corresponding control signal,
sequentially controlling, according to the clock signal, each row of light sources in the matrix to emit light in the preset light-emitting interval according to the corresponding color and brightness information comprises: for a matrix with M rows and N columns in the one or more matrices,
acquiring a current clock signal,
determining the $m^{th}$ row of light sources corresponding to the current clock signal, m being a positive integer not greater than M,
activating the $m^{th}$ row control line in response to determining the $m^{th}$ row of light sources, and
for each of the $m^{th}$ row of light sources, controlling a column control line corresponding to the light source according to the color and brightness information corresponding to the light source, so that the light source emits light in the preset light-emitting interval according to the corresponding color and brightness information; and/or,
sequentially controlling, according to the clock signal, each column of light sources in the matrix to emit light in the preset light-emitting interval according to the corresponding color and brightness information comprises: for a matrix with M rows and N columns in the one or more matrices,
acquiring a current clock signal,
determining the nth column of light sources corresponding to the current clock signal, n being a positive integer not greater than N,
activating the nth column control line in response to determining the $n^{th}$ column of light sources, and
for each of the $n^{th}$ column of light sources, controlling a row control line corresponding to the light source according to the color and brightness information corresponding to the light source, so that the light source emits light in the preset light-emitting interval according to the corresponding color and brightness information.

21. The control method according to claim 20, wherein each light source among the plurality of light sources comprises light-emitting diodes connected in parallel to the same row control line or the same column control line.

22. The control method according to claim 21, wherein when each light source comprises the light-emitting diodes connected in parallel to the same row control line, each column control line in each matrix comprises parallel sub-column control lines, and
for each of the $m^{th}$ row of light sources, controlling the column control line corresponding to the light source according to the color and brightness information corresponding to the light source, so that the light source emits light in the preset light-emitting interval according to the corresponding color and brightness information comprises: for each of the $m^{th}$ row of light sources, controlling the sub-column control lines corresponding to the light source according to the color and brightness information corresponding to the light source, so that the light source emits light in the preset light-emitting interval according to the corresponding color and brightness information.

23. The control method according to claim 22, wherein controlling the sub-column control lines corresponding to the light source according to the color and brightness information corresponding to the light source, so that the light source emits light in the preset light-emitting interval according to the corresponding color and brightness information comprises: for the $n'^{th}$ light source in the $m^{th}$ row of light sources, n' being a positive integer not greater than N,
determining, according to the color information corresponding to the light source, to activate which sub-column control lines among the $(a(n'-1)+1)^{th}$ sub-column control line to the $(an')^{th}$ sub-column control line corresponding to the light source, and determining, according to the brightness information corresponding to the light source, activation periods of some sub-column control lines that are determined to be activated in the preset light-emitting interval, wherein the higher the brightness indicated by the brightness information corresponding to the light source is, the longer the activation periods of some of the sub-column control lines in the preset light-emitting interval are.

24. The control method according to claim 21, wherein when each light source comprises the light-emitting diodes connected in parallel to the same column control line, each row control line in each matrix comprises parallel sub-row control lines, and for each of the $n^{th}$ column of light sources, controlling the row control line corresponding to the light source according to the color and brightness information corresponding to the light source, so that the light source emits light in the preset light-emitting interval according to the corresponding color and brightness information comprises: for the $m'^{th}$ light source in the nth column of light sources, m' being a positive integer not greater than M, determining, according to the color information corresponding to the light source, to activate which sub-row control lines among the $(a(m'-1)+1)^{th}$ sub-row control line to the $(am')^{th}$ sub-row control line corresponding to the light source, and determining, according to the brightness information corresponding to the light source, activation periods of some sub-row control lines that are determined to be activated in the preset light-emitting interval, wherein the higher the brightness indicated by the brightness information corresponding to the light source is, the longer the activation periods of some of the sub-row control lines in the preset light-emitting interval.

* * * * *